United States Patent [19]

Merrell et al.

[11] Patent Number: 4,853,132

[45] Date of Patent: Aug. 1, 1989

[54] PAINT SPRAY BOOTH TREATMENT

[75] Inventors: Gene A. Merrell, Huntingdon Valley; Deborah L. Purnell, Philadelphia, both of Pa.

[73] Assignee: Betz Laboratories, Inc., Trevose, Pa.

[21] Appl. No.: 161,866

[22] Filed: Feb. 29, 1988

[51] Int. Cl.$^4$ .............................................. C02F 1/56
[52] U.S. Cl. ................................. 210/712; 210/728; 55/85
[58] Field of Search ............... 210/702, 712, 714, 725, 210/727, 728, 735, 736, 908; 55/84, 85; 134/38; 427/331; 252/181

[56] References Cited

U.S. PATENT DOCUMENTS

| | | | |
|---|---|---|---|
| 4,170,553 | 10/1979 | Lang et al. | 210/709 |
| 4,600,513 | 7/1986 | Mizutani et al. | 252/181 |
| 4,637,824 | 1/1987 | Pominville | 55/85 |
| 4,661,262 | 4/1987 | Cost | 252/181 |

Primary Examiner—Peter Hruskoci
Attorney, Agent, or Firm—Alexander D. Ricci; Gregory M. Hill

[57] ABSTRACT

This invention relates to an improved method for treating paint wastes and paint oversprays encountered in wet paint spray booths or any areas where these wastes and oversprays exist.

8 Claims, 10 Drawing Sheets

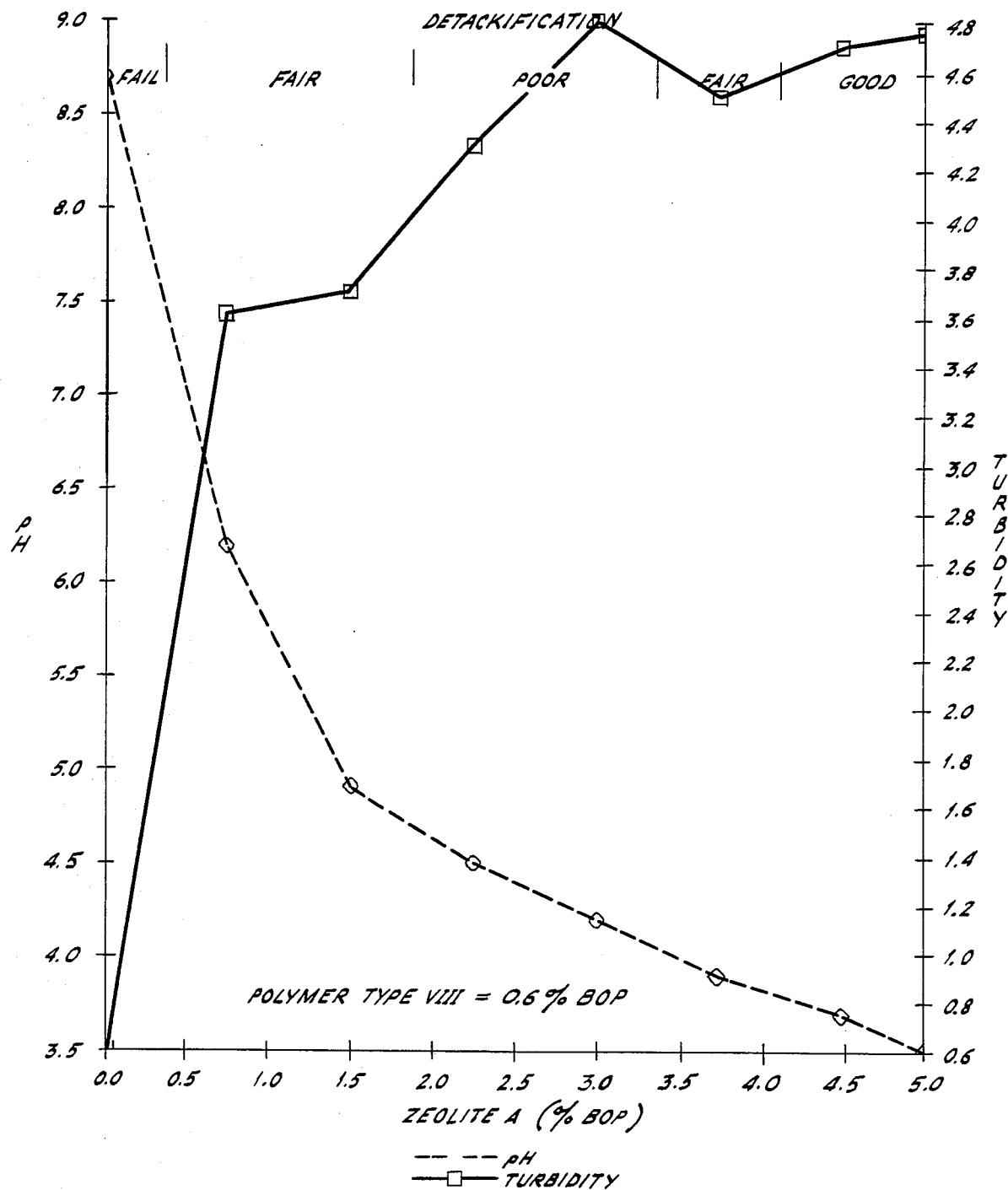

PAINT SPRAY BOOTH TREATMENT

FIELD OF THE INVENTION

This invention relates to an improved method for treating paint wastes and paint oversprays encountered in wet paint spray booths or any areas where these wastes and oversprays exist.

BACKGROUND OF THE INVENTION

The spray painting of automobile bodies, truck engines, appliances, and other industrial goods is customarily carried out in enclosed areas called paint spray booths (PSB). These booths act both to contain any fumes or oversprayed paint, to reduce the chances of dust contamination, and to protect the painters. These booths vary in size, but are somewhat basic in their design and operation. A typical booth would thus consist of a work area, back section with mist eliminators, and a sump.

The units to be painted generally pass through the work area while an air flow makes the oversprayed paint contact either the sump water or the spray from the water curtain. The air is scrubbed with recirculated water at the water curtain, passes through the mist eliminators, and is removed by an exhaust fan.

Even though paint transfer efficiencies have increased through improved application technologies, roughly one-half of all paint sprayed does not reach its intended article. As a result, a significant concentration of paint builds in the system and agglomeration can occur. The resultant mass is a sticky, tacky material, which can plug the mist eliminators, shower heads, and even recirculating pumps. When this happens, scrubbing efficiency decreases, leading to potentially hazardous conditions of unchecked paint emissions being discharged into the atmosphere. Such conditions may also present severe safety hazards to paint spray booth operators.

This process involves other problems. These tacky organic deposits are subject to bacterial growth and fungi proliferation, which conditions generate corrosion and odor problems. In addition, the paint solids that are recirculated can form suspensions in the water. They remain tacky and can create expensive separation and disposal problems.

These problems show, therefore, the desirability to treat PSB water systems so as to reduce or prevent as much as possible the agglomeration and deposition of oversprayed paint on critical PSB operation parts; to render the resultant sludge non-tacky and easily removable; and to provide a water quality such that it can be recycled for use in the system.

Another problem associated with paint detackification and separation from the paint spray booth water wash system is the disposal cost associated with removal of the resulting paint sludge. For economic reasons, it is highly desirable to provide a PSB chemical treatment that results in a high solids (low moisture) sludge with a reduced or low volume sludge so that disposal costs may accordingly be minimized.

PRIOR ART

Many and varied chemical treatments have been proposed for detackifying the paint and providing a manageable sludge. For instance, in U.S. Pat. No. 3,515,575 (Arnold), it is suggested that the addition of at least 0.5 ppm of a water soluble polymer having repeat groups with the formula:

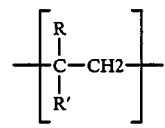

R = a hyrogen or methyl group
R' = an amide or carboxyl group to a paint spray booth wash water containing alkali, wetting agents, absorbents, and defoaming agents is effective at deactivating and collecting overspray paints.

This treatment approach was simplified in subsequent teachings. Examples include U.S. Pat. Nos. 3,990,869 (Forney), 4,067,806 (Mauceri), and 4,440,647 (Puchalski). These patents discuss the use of a variety of cationic polymers in conjunction with amphoteric metal salts and pH adjustment.

U.S. Pat. No. 4,686,047 (Arots) describes a cationic polymer treatment that does not require the use of amphoteric metal salts or other additives to achieve high performance and efficacy, as long as the pH is maintained above at least 6. Arots demonstrates the technique with polymer levels of 4–40%, based on overspray paint, at pH's adjusted to 10.

Similarly, U.S. Pat. No. 4,656,059 (Mizuno, etal.) uses a colloidal solution of a melamine-aldehyde resin with pH adjustment to provide detackification. Other additives are suggested for improving the performance of the detackifier and for paint sludge handling (surface active agent for improving paint dispersibility and emulsifiability and a flocculant for improving solid-liquid separating properties). The treatment levels used in the examples are 0.1–5%, based on overspray paint.

As an improvement on Mizuno, U.S. Pat. No. 4,629,572 (Leitz, et al.) incorporates the use of a waterswellable clay with colloidal solutions of urea or an amino triazine (melamine) aldehyde resin.

Other patents which may be of interest include U.S. Pat. Nos. 4,185,970 (Dean), 4,220,456 (Block), 4,504,395 (Harpel, et al.), and 4,564,464 (Harpel, et al.).

GENERAL DESCRIPTION OF THE INVENTION

The above and other problems in the field of paint spray booth chemical treatments are addressed by the present invention. It has been discovered that the precipitate formed by the combined use of certain inorganic anions and cationic polymers is effective at detackifying and conditioning overspray paint. More specifically the invention comprises a process for detackifying and coagulating paint, lacquer, or enamel in spray booths in which water is used to wash air in said booth and to remove oversprayed paints, enamels, or lacquers and wherein said water is recirculated for further washing the air in said spray booth. The inventive process comprising the steps of adding a water-soluble cationic polymer in combination with a water soluble salt of an inorganic anion, the anion of which reacts with said polymer to produce a precipitate which in turn detackifies and coagulates the paint, lacquer or enamel to provide a paint sludge that is high in solids and low in volume.

The effectiveness of the combination of cationic polymer and anion can be determined by a simple procedure. The procedure entails the use of a number of containers to which water and a definite concentration of cationic polymer have been added.

The anion of course is provided to containers by adding a water-soluble salt of the anion. After an appropriate equilibration period, the turbidity of the resulting mixture is measured by a standard conventional method. The turbidity as a function of anion is plotted with the most efficacious combinations determined as being those which exhibit an increasing turbidity throughout the range of anion concentrations tested. A more detailed description of the test appears infra.

The cationic polymers as well as the salts (anions) may be added to the paint spray booth washing system on a continuous or on a "shot feed" basis.

BRIEF DESCRIPTION OF THE DRAWINGS

FIGS. I-X are plots used to determine functional combinations of inorganic anions and cationic polymers that provide paint detackification.

DETAILED DESCRIPTION OF THE INVENTION

Figure 1:
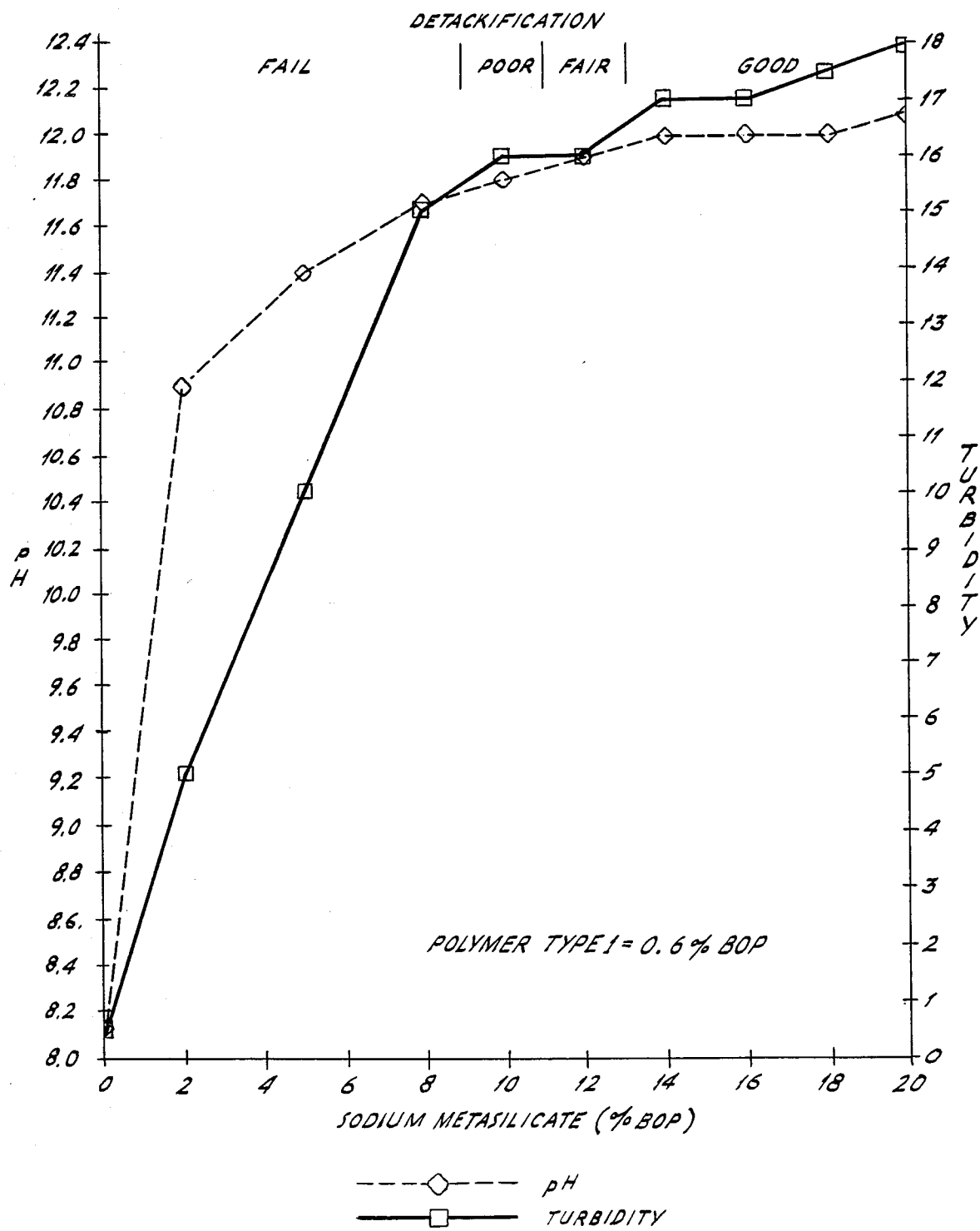

Despite the above-mentioned prior art efforts, there remained a need in the art for a treatment program(s) that effectively detackifies the paint, provides a paint sludge that is high in solids and of low volume, reduces or eliminates corrosion (i.e, chlorides contained in Forney, Mauceri, and Puchalski), contains no known hazardous ingredients (i.e., residual free formaldehyde, a carcinogen, contained in Mizuno and Leitz), and is easy to apply and control.

In accordance with the present invention, it has been discovered that the use of a variety of specific inorganic anions in conjunction with cationic polymers provides for the above mentioned improvements in the art of paint spray booth treatment. The prescribed combinations of this invention, which must pass the test later described, produce a precipitate that acts to detackify the paint and condition the paint sludge. This precipitation action is a necessary and critical essence of this discovery.

More specifically, water soluble salts of the following anions in particular the sodium, potassium and ammonium salts thereof have been found to be particularly effective according to the present invention in providing the desired detackification and sludge conditioning results:

A. Metasilicate—$SiO_3^{2-}$
B. Orthosilicate—$SiO_4^{-4}$
C. Disilicate—$Si_2O_5^{-2}$
D. Mixed silicates—$Na_2O \cdot xSiO_2$ (where x=3-5)
E. Metaaluminate—$AlO_2^{31}$
F. Aluminosilicates—$Na_2O \cdot xAl_2O_3 \cdot ySiO_2$
G. Molybdates—$Mo_7O_{24}^{-6}$
H. Phosphomolybdate—$(PO_4)2 \cdot 12MoO_3^{6-}$
I. Phosphates—$PO_4^{3-}$, $P_2O_7^{4-}$
J. Borates—$B_2O_4^{2-}$ The active water soluble or water dispersible cationic polymers of the present invention may be described as by medium to low molecular weight, as having a high charge density, crosslinked or linear, condensation or addition polymers. The molecular weight range active in this invention is between about 1,000 and 600,000 average molecular weight. The charge densities, as determined by the PVSK Colloid Titration Method (H. Terayama, Kayaku no Kenkya, Vol.1, p. 75, 1948; H. Terayama, Kayaku no Kenkya, Vol.4, p. 31, 1949; R. Senju, "Koroido Tekiteiho", Nankodo, Tokyo, 1969), are active in the range of about 1.5 to 12. meq/g active polymer.

Examples of these polymers, which have demonstrated the desired performance characteristics, are

| Polymer Type | Description |
|---|---|
| I. | Polydiallyl dimethyl ammonium chloride, such as CPS Chemical Company's Ageflex. |
| II. | Condensation product of polyamine plus ethylene dichloride, such as Dow Purifloc C-31. |
| III. | Condensation product of dimethylamine plus epichlorohydrin plus ethylene diamine, such as American Cyanimid Magnifloc 581C. |
| IV. | Condensation product of melamine and formaldehyde, such as Exxon Jayfloc 824. |
| V. | Condensation product of diethylenetriamine plus adipic acid plus epichlorohydrin, such as Betz Polymer 1175. |
| VI. | Condensation product of dimethylaminopropylamine plus epichlorohydrin, such as described in U.S. Pat. No. 3,915,904 (Tonkyn, etal.) |
| VII. | Condensation product of hexamethylenediamine still bottoms plus ethylene dichloride, such as Monsanto Santofloc F. |
| VIII. | Condensation product of dimethylamine plus epichlorohydrin, such as described in U.S. Pat. No. 3,738,945 (Panzer & Dixson) |

| Polymer Type | Average Molecular Weight | Charge Density |
|---|---|---|
| I | 400,000 | 5.7 |
| II | 300,000 | 11.9 |
| III | 600,000 | 6.4 |
| IV | 80,000 | 1.8 |
| V | 400,000 | 5.5 |
| VI | 15,000 | 7.8 |
| VII | 10,000 | 11.0 |
| VIII | 8,000 | 6.7 |

Neither the inorganic anion nor cationic polymer act as detackifiers alone, over the range of dosages examined. The criticality of the choice of cationic polymer for use with a given inorganic anion and the ratio of the two components will be illustrated in the examples presented below.

As the present invention is practiced, an aqueous solution of the inorganic anion and an aqueous solution containing the cationic polymer are added separately to the paint spray booth recirculating water before the introduction of the overspray paint. The solutions can be admitted to the paint spray booth system at varied locations including: the pump, upstream from the pumps, or at any advantageous position along the circulating water system.

The solutions of inorganic anion and cationic polymer are either shot fed or continuously fed to the paint spray booth water system. The inorganic anion is chosen based on the paint type, cationic polymer, system mechanical design, and the operating parameters of the specific plant. In general, the inorganic anion treatment level will be in the range of 0.01–15% anion, based on overspray paint (BOP). Although the cationic polymer treatment level is dependent on many factors (paint type, water chemistry, inorganic anion chosen, etc.), the operable dosage rate of the cationic polymer will generally be in the range of 0.01–10% active polymer, based on overspray paint. Preferably, the inorganic anions of the present invention are added within the range of 0.05 to 10% anion, based on overspray paint, and the cationic polymers are added within the range of 0.05–5% active polymer, based on overspray paint.

Paint, as used herein, is a broad-based term used to describe the coating applied to a given object. Paints are normally composed of a film former (the resin which forms the coating), a solvent or carrier (water or organic), pigments (for color), and additives such as biocides, drying agents, viscosity modifiers, etc. In general, the solvent is used to classify the paint type: either water base or oil base. Technically, if the paint forms its coating by evaporation of the solvent without chemical reaction, it is a lacquer. If the coating is formed via cross-linking, it is an enamel.

SPECIFIC EMBODIMENTS

Jar Testing Procedure

A standard jar test procedure is used to determine the operable and proper combinations of cationic polymer and inorganic anion. The general procedure is to add 100 ml of tap water to a 120 ml jar. The treatments are added, and the bottle capped and shaken to mix the contents and coat the internal surfaces of the jar with the treated water. One (1) ml of paint is added to the jar. After vigorous shaking for 30 seconds, a wooden tongue depressor is immersed in the solution and then removed for examination. The following guidelines are used for examining the detackification performance of the treatment.

| Rating | Definition |
| --- | --- |
| Fail | Paint forms large tacky globules and/or coating which adheres to the exposed surfaces of the jar and tongue depressor. |
| Poor | Paint forms agglomerates which are slightly tacky or smeary to touch, or upon crushing. Paint sludge coats the tongue depressor. |
| Fair | Paint forms granular flocs or globules which adhere to less than 10% of the exposed surface area of the jar or depressor. Sludge may be smeary, but not tacky. |
| Good | Paint forms particles or globules, some of which appear as specks on less than 1% of the exposed surface area of the jar or depressor. Sludge is neither smeary nor tacky. |
| Excellent | Paint forms particles which do not adhere to the exposed surfaces of the jar or depressor. The paint sludge may float, sink, or be dispersed in the water. |

Criticality of Precipitation

To demonstrate that the formation of a precipitate (upon mixing the cationic polymer and inorganic anion in the water) is necessary for detackification, a series of jar tests were performed at constant cationic polymer dosage. The level of inorganic anion was varied, and the pH, and turbidity were measured prior to paint addition. For this series of experiments, a sodium metasilicate solution provided the inorganic anion metasilicate. Each cationic polymer dosage was constant at 0.6% cationic polymer active solids, based on paint. The paint used in these experiments was a commercial garnet red, automotive high solids, semi-rigid base coat (approximately equal parts urethane, polyester, and acrylic resins).

The results are illustrated in FIGS. I-VIII. The polymer type designation contained in the figures and subsequently in this present invention corresponds to the numbering system used above.

In FIGS. I-VIII, it is demonstrated that a minimum amount of precipitation, as indicated by turbidity, must be obtained and maintained for the anion (in these cases metasilicate)/cationic polymer blend to provide the detackification. The relative amount of precipitation (turbidity) necessary for performance is polymer dependent, and the effective inorganic anion/cationic polymer ratio is found to be dependent on the polymer type chosen. In addition, in FIGS. II and V it is observed that a given inorganic anion may not be effective with all cationic polymers.

Functional pairings of inorganic anion/cationic polymer can be determined from plots of turbidity versus inorganic anion concentration (100 to 2000 ppm), at a fixed level of 60 ppm cationic polymer active. Those curves exhibiting an increasing turbidity throughout the range of inorganic anion concentrations define functional pairings, the efficacious ration of inorganic anion/cationic polymer and the total required treatment level are determined through the jar testing procedure described as follows:

TURBIDITY CURVE DETERMINATION METHOD

This method is used to determine those functional combinations of inorganic anions and cationic polymers that provide paint detackification according to the present invention.
1. Place 100 ml of tap water into each of ten 120 ml Boston Square jars.
2. Add 6 mg of active cationic polymer to each jar and shake to mix.
3. Add increasing increments of the inorganic anion to the series of jars encompassing the range of 10 to 200 mg inorganic anion. Shake the jars to mix.
4. After 1 minute for equilibration, measure the turbidity by standard methods.
5. Plot the turbidity as a function of the amount of inorganic anion added to the jar. Efficacious combinations of inorganic anions and cationic polymers will exhibit an increasing turbidity throughout the range of inorganic anion addition described in step 3.

Figure 2:
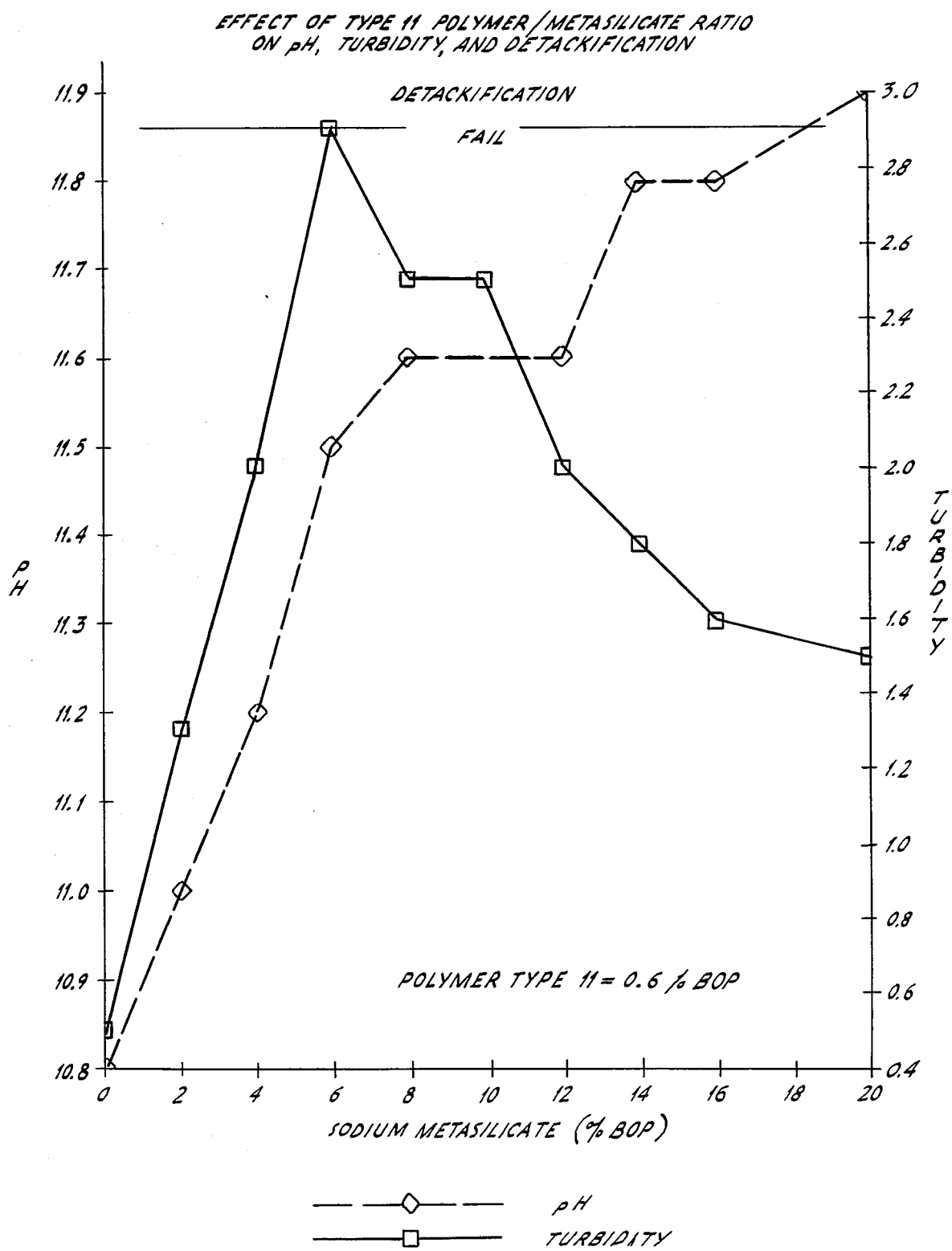
Figure 3:
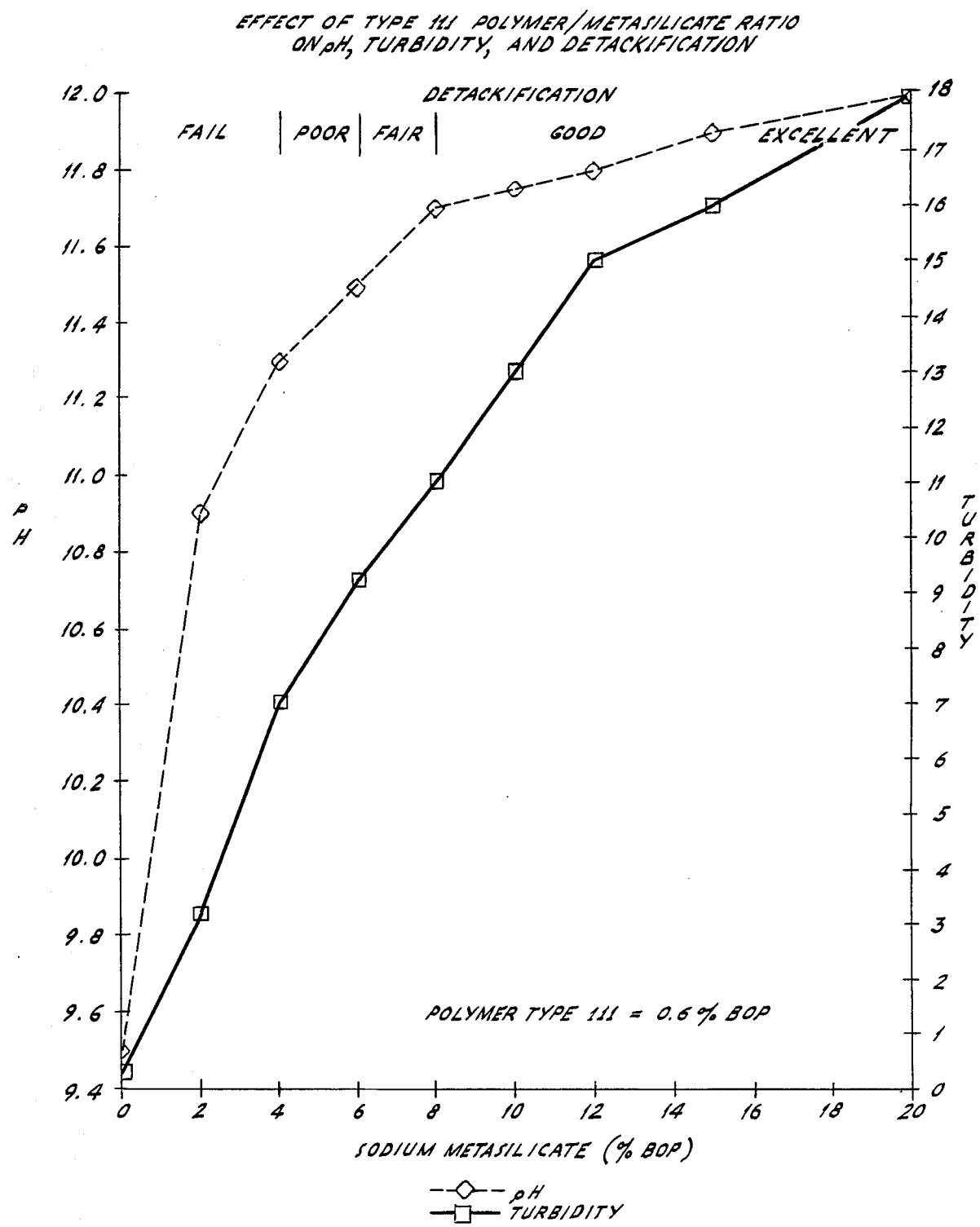
Figure 4:
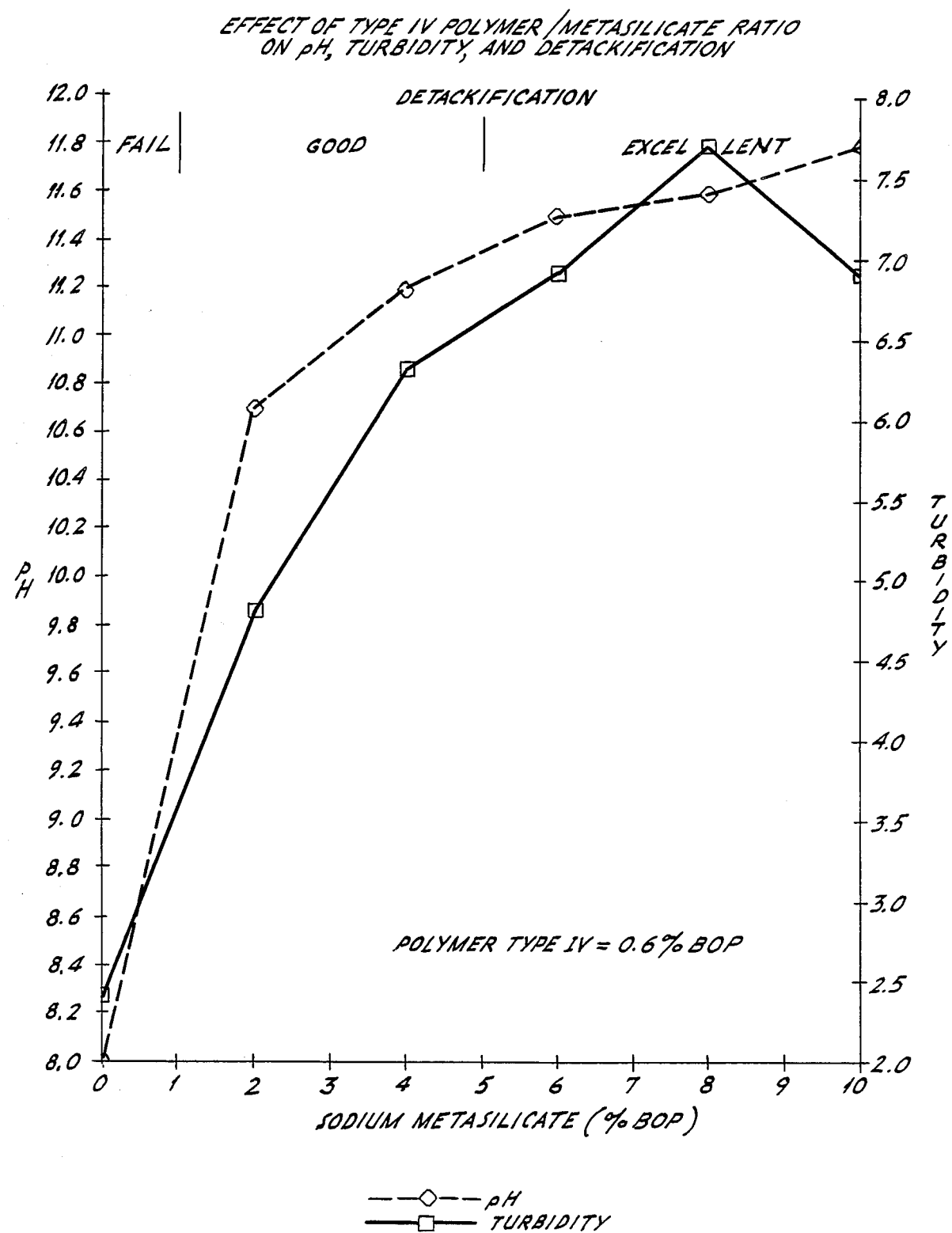
Figure 5:
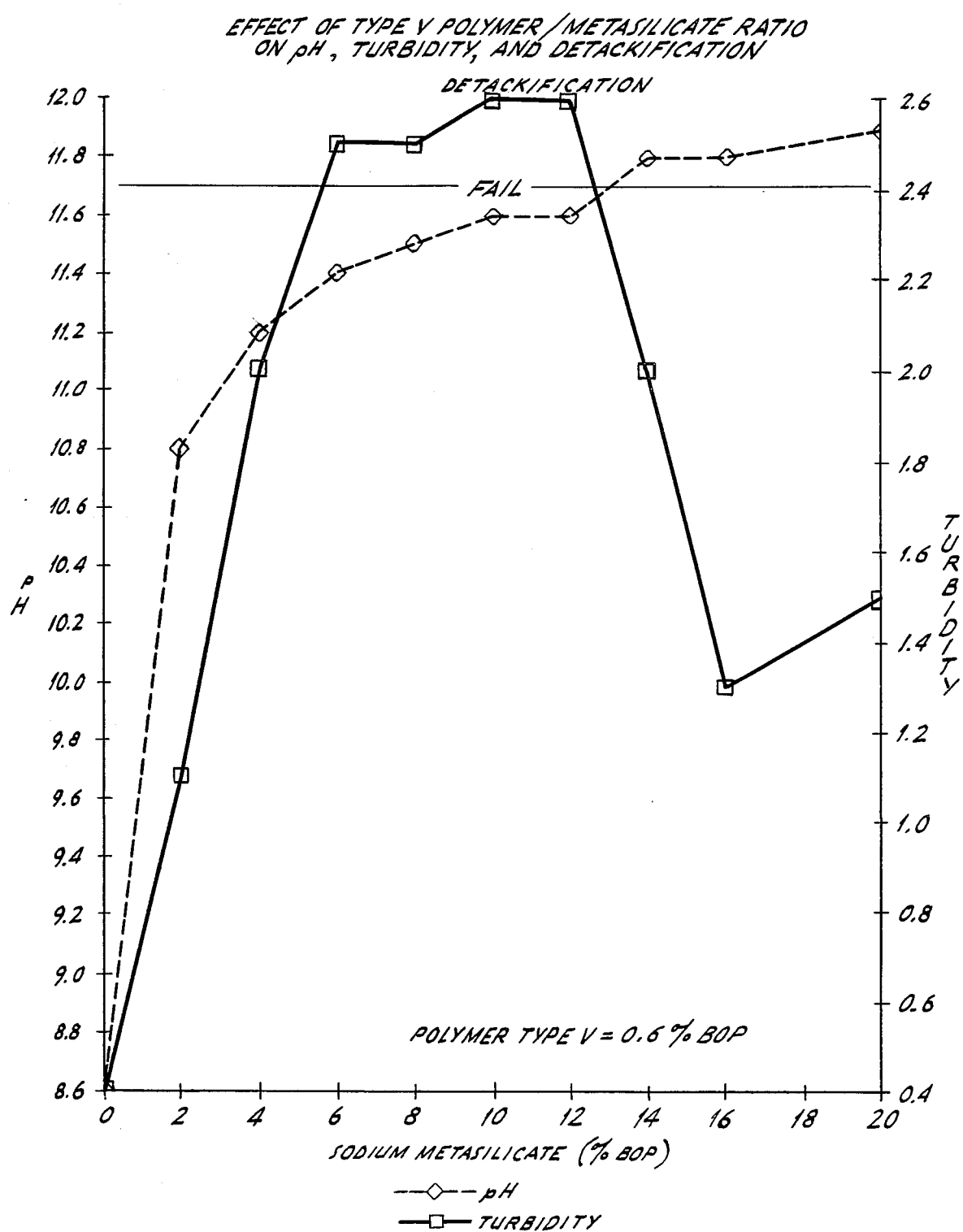
Figure 6:
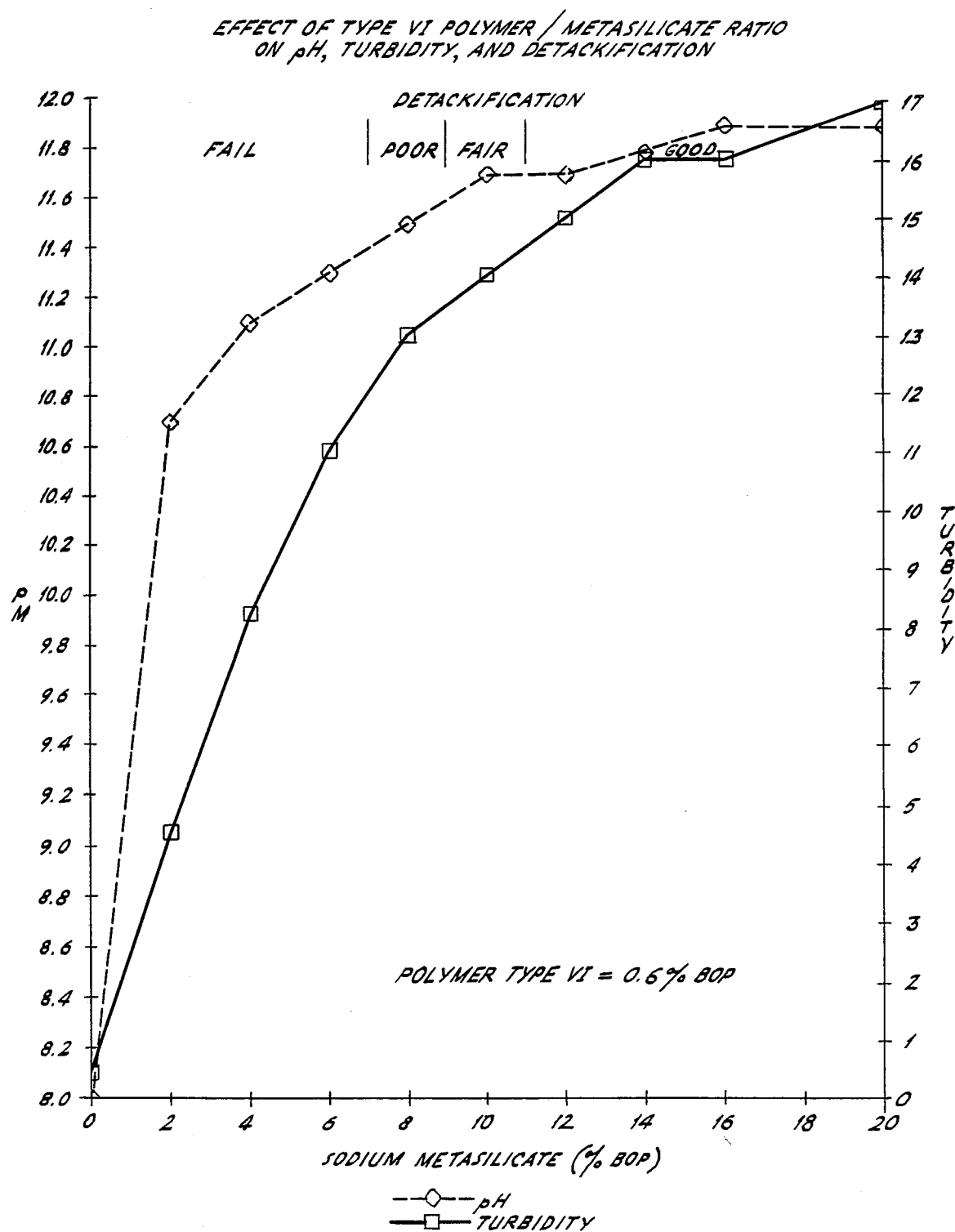
Figure 7:
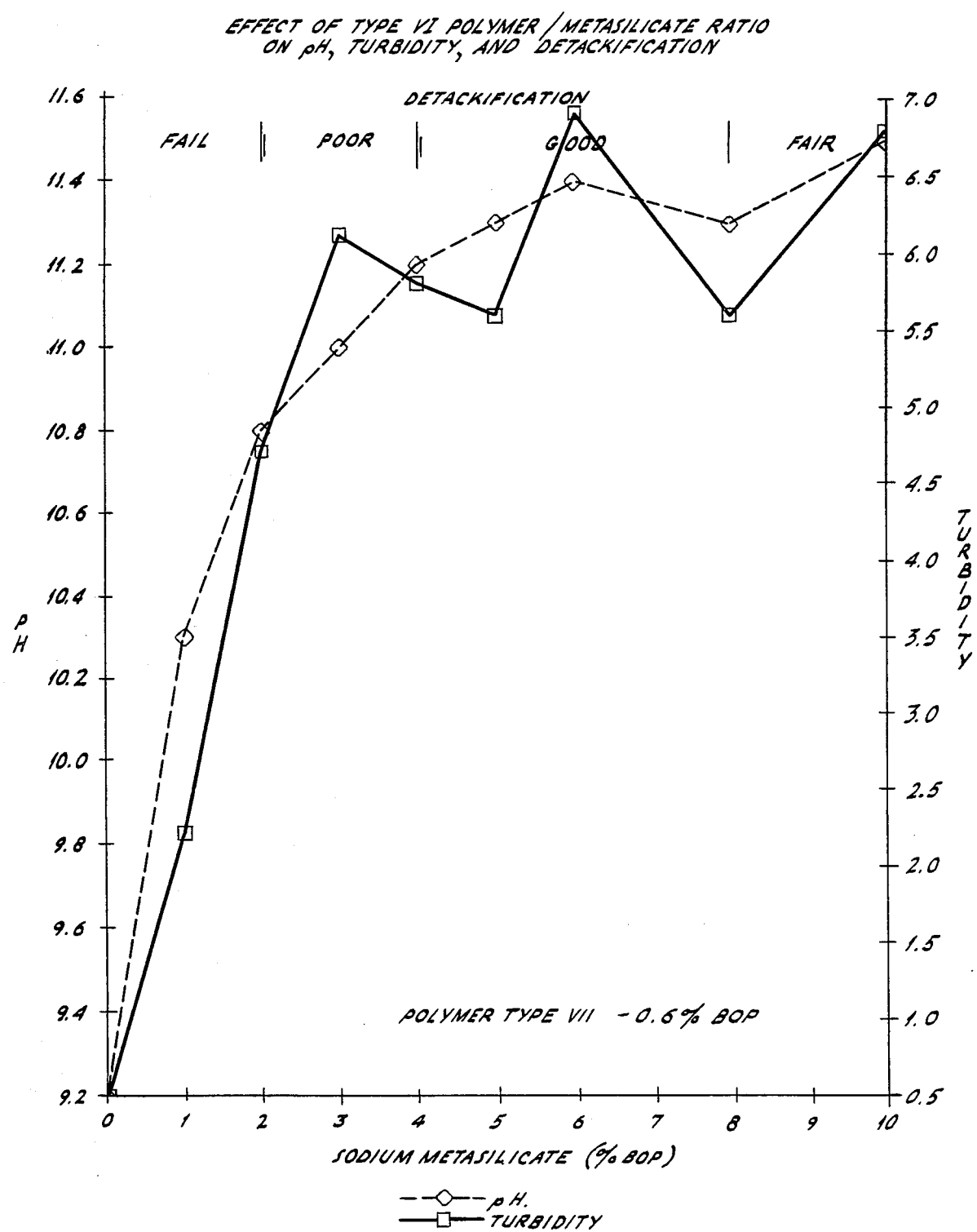
Figure 8:
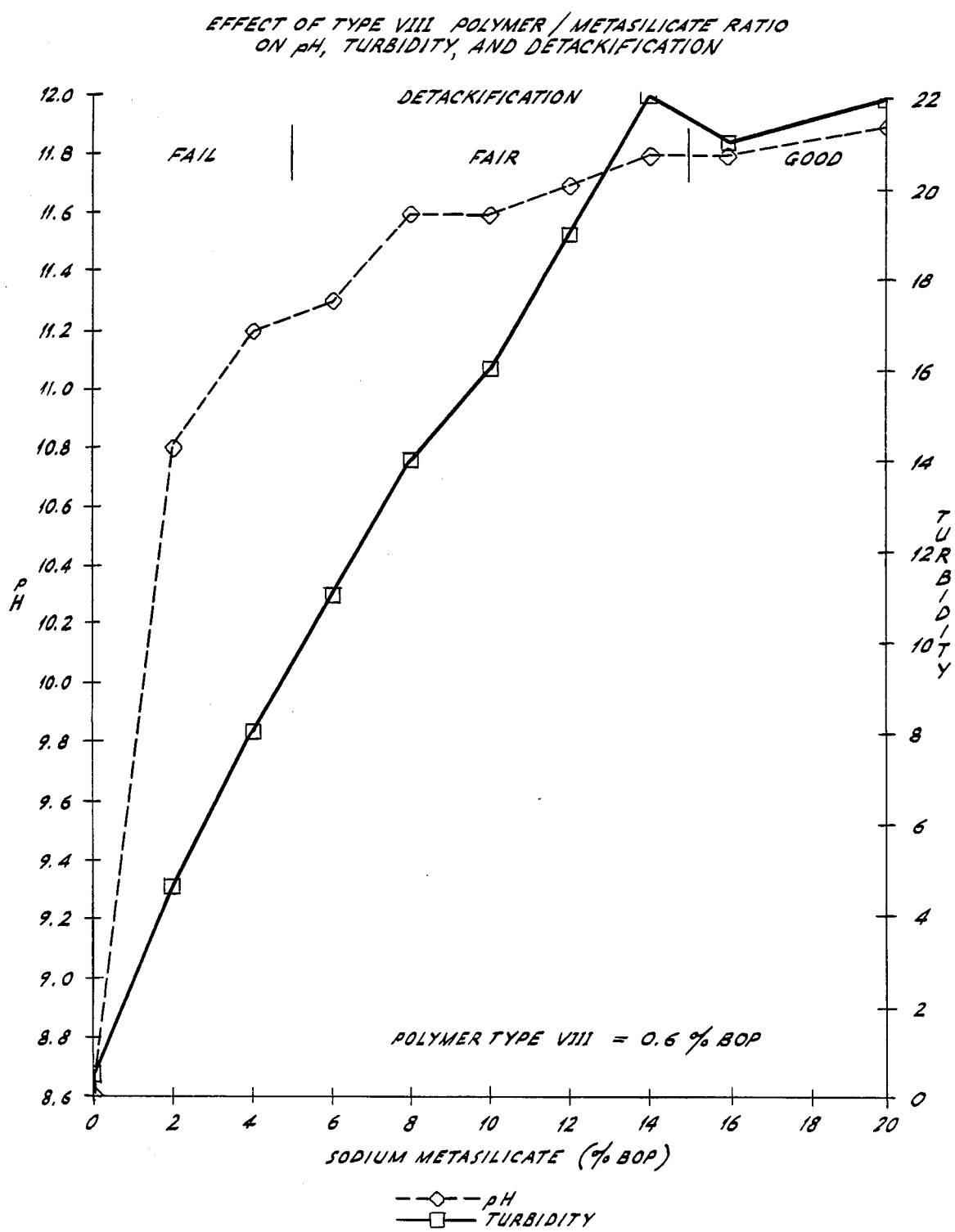
Figure 9:
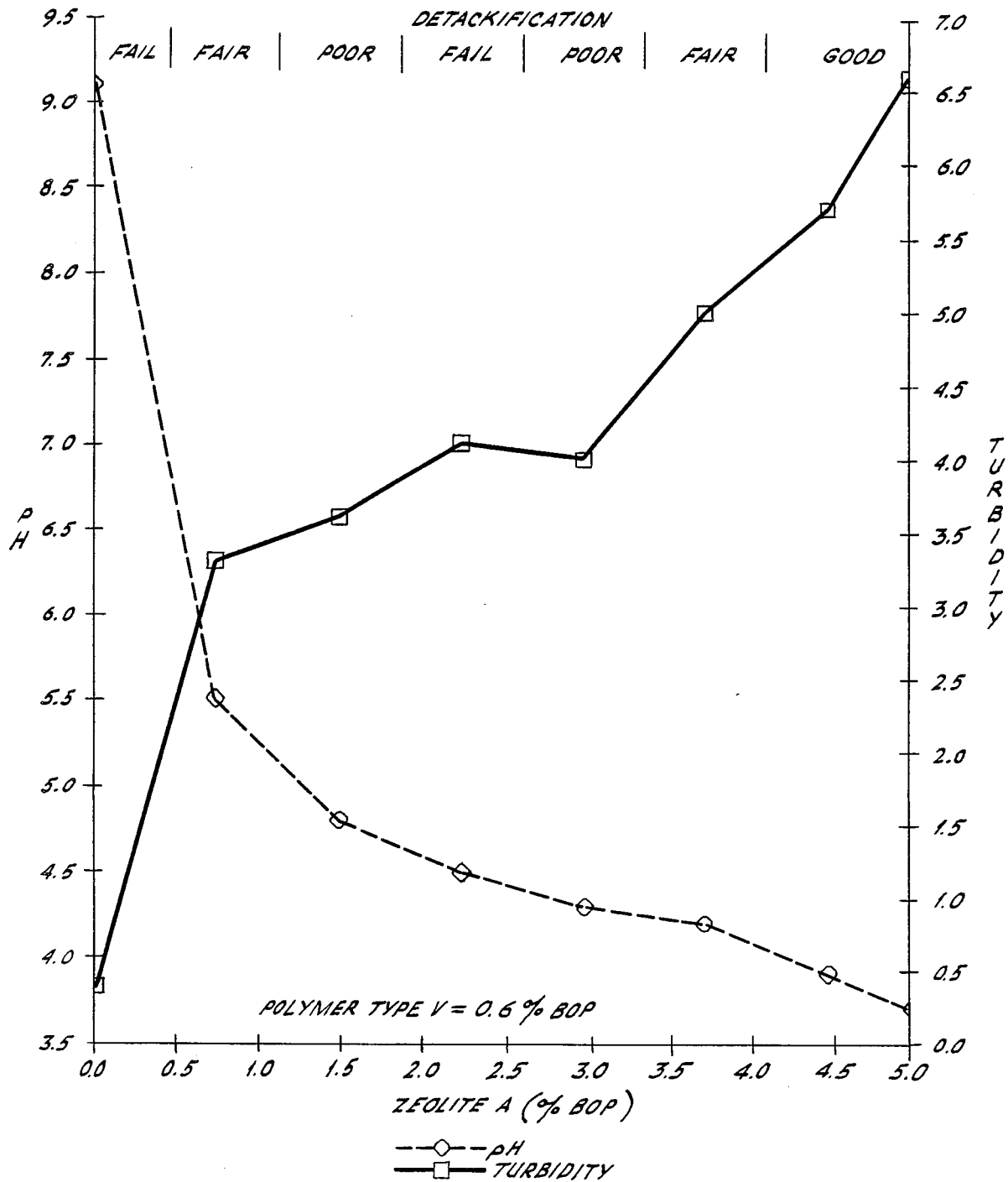

In this regard the figures should be reviewed noting that the combination set forth and represented in FIGS. 2 and 5 did not meet the necessary criteria.

Effect of pH

With sodium metasilicate providing the inorganic anion, the treated solution pH was observed to increase with increasing dosage. In order to determine whether the highly alkaline conditions, pH greater than 11.4, was providing the observed detackification, jar tests were performed on polymer types III, IV, VI, and VII with solution pH's adjusted alkaline with NaOH before paint addition. The results are listed in Table 1.

TABLE 1

EFFECT OF pH ADJUSTMENT ON THE TURBIDITY AND DETACKIFICATION

| Polymer Type | pH | Turbidity | Detackification |
|---|---|---|---|
| III | 11.6 | 1.0 | Fail |
|  | 11.8 | 1.2 | Fail |
|  | 12.0 | 1.5 | Fail |
| IV | 11.6 | 4.5 | Good |
|  | 11.8 | 4.2 | Good |
|  | 12.0 | 4.2 | Fair |
| VI | 11.6 | 2.0 | Fail |
|  | 11.8 | 1.5 | Fail |
|  | 12.0 | 1.0 | Fail |
| VII | 11.6 | 8.8 | Fail |
|  | 11.8 | 6.0 | Fail |
|  | 12.0 | 6.0 | Fail |

Only polymer type IV exhibits efficacy with pH adjustment alone. However, it is well known that solutions of this polymer type are metastable to precipitation. Alteration of the ionic strength of this polymer solution by many solutes (caustic, soda ash, sodium bicarbonate, salts, etc.) will initiate precipitation.

The remaining polymer types were not activated by pH elevation alone. This is further illustrated in FIGS. IX and X. In these experiments, a solution of zeolite, prepared by dissolving Ethyl Corporation EZA Zeolite A in 3% sulfuric acid, was used to provide the inorganic anion aluminosilicate.

As observed in FIGS. IX and X, the art of this present invention is also active at acidic pH's. Therefore, pH adjustment is not necessary for detackification performance. In addition, the efficacy of the aluminosilicate anion is demonstrated. More importantly, it is demonstrated that, although polymer type V was not effectively used in conjunction with the metasilicate anion, the aluminosilicate anion does provide an efficacious combination with the type V polymers. Therefore, the proper selection of an inorganic anion for use with a given cationic polymer is critical. Selection of the appropriate inorganic anion/cationic polymer combination can be based on the shape of the turbidity curve and the resultant detackification.

EFFECTIVE INORGANIC ANIONS

Standard jar tests, as described above, were used to examine the activity of a variety of inorganic anions. The same paint was used for this series of evaluations; commercial garnet red, automotive high solids, semi-rigid base coat (approximately equal parts urethane, polyester, and acrylic resins). All the cationic polymer dosages are 0.6% active polymer, based on paint. The results are presented in Table 2.

TABLE 2

EFFECT OF CATIONIC INORGANIC ANIONS/CATIONIC POLYMERS ON PAINT DETACKIFICATION

| Anion | Dosage (% BOP) | Cationic Polymer Type (0.6% BOP) | | | | | | | |
|---|---|---|---|---|---|---|---|---|---|
|  |  | I | II | III | IV | V | VI | VII | VIII |
| $PO_4$ | 3. |  | Excell |  |  |  |  |  | Good |
| $P_2O_7$ | 7.9 |  | Good |  |  |  |  |  |  |
| $B_2O_4$ | 0.6 |  | Good |  |  |  |  |  |  |
| PMo (1) | 1.6 | Good |  |  | Good |  |  | Good |  |
|  | 2.3 |  | Fair |  |  | Fair | Good |  | Good |
| $MoO_4$ | 1.6 |  |  |  | Good |  |  |  |  |
| $SiO_2$ | 9.8 | Good |  |  |  |  | Good |  | Good |
|  | 7.8 |  | Good |  |  |  |  |  |  |
|  | 2.9 |  |  |  |  |  | Good |  |  |
|  | 2.5 |  | Good |  |  |  |  |  |  |
| $AlSiO_2$ (2) | 5.0 |  |  |  |  | Good |  |  | Good |

(1) PMo = $(PO_4)2.12MoO_3$
(2) $AlSiO_2$ = $Na_2O.xAl_2O_3.ySiO_2$

These data demonstrate the range of inorganic anion/cationic polymer combinations that can provide the desired detackification and sludge conditioning characteristics of the present invention.

PAINT DEPENDENCE

The essence of the present invention is not limited to the paint type used in the above examples. By the proper selection of inorganic anion/cationic polymer combinations and ratios, the majority of paints spray in wet paint spray booths can be effectively treated. This is illustrated below for seven (7) high solids paint types.

| PAINT | EFFECTIVE TREATMENTS* | |
|---|---|---|
|  | Anion (% BOP) | Polymer Type (% BOP) |
| Flexible Base Coat, Pearlescent Blue | Metasilicate (12.5) | I (0.4) |
|  | Metasilicate (9.3) | III (0.7) |
|  | Aluminosilicate (5.) | III (0.7) |
|  | Metasilicate (3.1) | IV (0.6) |
|  | Aluminosilicate (5.) | VII (1.3) |
|  | Metasilicate (12.5) | VIII (0.6) |
| Rigid Top Coat, Red | Metasilicate (12.5) | I (0.5) |
|  | Metasilicate (12.5) | III (0.7) |

-continued

| PAINT | EFFECTIVE TREATMENTS* | | |
|---|---|---|---|
| | Anion (% BOP) | | Polymer Type (% BOP) |
| | Metasilicate | (3.1) | IV (0.6) |
| | Metasilicate | (3.1) | VII (1.3) |
| | Metasilicate | (12.5) | VIII (0.6) |
| White | Metasilicate | (12.5) | I (0.5) |
| | Metasilicate | (12.5) | III (0.7) |
| | Metasilicate | (3.1) | IV (0.6) |
| | Metasilicate | (3.1) | VII (1.3) |
| | Metasilicate | (12.5) | VIII (0.6) |
| Light Blue | Metasilicate | (12.5) | I (0.5) |
| Metallic | Metasilicate | (12.5) | III (0.7) |
| | Metasilicate | (3.1) | IV (0.6) |
| | Metasilicate | (3.1) | VII (1.3) |
| | Metasilicate | (12.5) | VIII (0.6) |
| Rigid Base Coat, | | | |
| Black Sapphire | Metasilicate | (12.5) | I (0.5) |
| | Metasilicate | (12.5) | III (1.3) |
| | Metasilicate | (3.1) | IV (0.6) |
| | Metasilicate | (6.2) | VII (1.3) |
| | Metasilicate | (12.5) | VIII (0.6) |
| Semi-Rigid Base Coat, Blend of equal parts Black, Graphic Red, White, and Red Burgundy | Metasilicate | (12.5) | I (0.5) |
| | Metasilicate | (12.5) | III (1.3) |
| | Metasilicate | (3.1) | IV (0.6) |
| | Metasilicate | (6.2) | VII (1.3) |
| | Metasilicate | (12.5) | VIII (0.6) |
| Rigid Clear Coat | Metasilicate | (10.0) | I (0.4) |
| | Metasilicate | (3.7) | II (0.7) |
| | Metasilicate | (6.2) | IV (0.6) |
| | Metasilicate | (3.7) | V (0.6) |
| | Metasilicate | (6.2) | VII (0.6) |
| | Metasilicate | (12.5) | VIII (0.6) |
| Semi-Rigid Clear Coat | Metasilicate | (12.5) | I (0.4) |
| | Metasilicate | (6.2) | II (0.7) |
| | Metasilicate | (6.2) | V (0.6) |
| | Metasilicate | (6.2) | VII (0.6) |
| | Metasilicate | (12.5) | VIII (0.6) |

*The treatments listed provided good-excellent detackification.
The metasilicate anion was provided by sodium metasilicate.
BOP = based-on-paint.

PILOT BOOTH TREATMENT

As a further example of the practice of the present invention, metasilicate/Type VII polymer treatments were evaluated in a pilot Binks Center Well wet paint spray booth. Pertinent operating data for these tests are:
Total water volume = 60 gallons
Recirculation rate = 40 gallons/minute
Flow over center well = 20 gallons/minute
Total paint loading = 2000 cc
Paint rate = 15 cc/minute TEST I—A semi-rigid, red base coat was sprayed at 10 cc/minute along with a semi-rigid clear coat at 5 cc/minute. The treatments were added separately to the recirculation pump outlet. Before painting commenced, the system was charged with 48.8 ppm of sodium metasilicate and 3.0 ppm Type VII active cationic polymer. Continuous treatment was begun in conjunction with painting. At the end of the painting period, the resultant sludge was removed from the system were determined (O'Haus Moisture Balance) to be 66%. The overall treatment levels, at the completion of the test were 4.2% metasilicate, based on paint, and 0.95% Type VII cationic polymer, based on paint.

TEST II—A blend of semi-rigid base coats (equal parts black, graphic red, white, and red burgundy) was sprayed at 10 cc/minute along with a semi-rigid clear coat at 5 cc/minute. The treatments were added separately to the recirculation pump outlet. Before painting commenced, the system was charged with 48.8 ppm of sodium metasilicate and 3.0 ppm Type VII active cationic polymer. Continuous treatment was begun in conjunction with painting. At the end of the painting period, the resultant sludge was determined to be well detackified. The percent solids of the sludge removed from the system were determined (O'Haus Moisture Balance) to be 58%.

The overall treatment levels, at the completion of the test were 5.3% metasilicate, based on paint, and 1.2% Type VII cationic polymer, based on paint.

Although the efficacy of the present invention has been demonstrated by a limited number of inorganic anion/cationic polymer combinations on a small number of paint types, the skilled artisan will appreciate that combinations of inorganic anions with cationic polymers will prove effective, in accordance with the invention, for the range of paints sprayed in wet paint spray booths.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

What we claim is:

1. A process for detackifying and coagulating paint, lacquer, or enamel in spray booths in which water is used to wash air in said booth and to remove oversprayed paints, enamels, or lacquers from said water prior to said water being recirculated for further washing the air in said spray booth, said process consisting essentially of the steps of adding to said water a sufficient amount for the purpose of a water-soluble or water-dispersible cationic polymer selected from the group consisting of:

condensation polymers of dimethylamine and epichlorohydrin and ethylene diamene, condensation polymers of melamine and formaldehyde, condensation polymers of diethylenetriamine and adipic acid and epichlorohydrin, condensation polymer of dimethylaminopropylamine and epichlorohydrin, and condensation polymer of dimethylamine and epichlorohydrin, in selective combination with a sufficient amount for the purpose of a water-soluble salt selected from the group consisting of metasilicate, orthosilicate, disilicate, mixed silicates, metaaluminate, molybdates, phosphomolybdates and phosphates, the anion of said salt reacting with said polymer to cause said polymer to form a precipitate in said water which in turn detackifies and coagulates said paint, lacquer or enamel to provide a paint sludge that is high in solids and low in volume.

2. A process as recited in claim 1 wherein said water soluble or water dispersible cationic polymer is added in an amount of from about 0.05 to 5 weight percent and said salt is added in an amount sufficient to produce 0.01 to 15 weight percent anion, both based upon the weight of said oversprayed paint, lacquer or enamel.

3. A method according to claim 1 wherein said anion is a silicate anion.

4. A method according to claim 1 wherein said polymer is a condensation polymer of dimethylamine, epichlorohydrin and ethylene diamine and said anion is a silicate anion.

5. A method according to claim 1 wherein said polymer is a condensation polymer of melamine and formaldehyde and said anion is a silicate anion.

6. A method according to claim 1 wherein said polymer is a condensation polymer of dimethylaminopropylamine and epichlorohydrin and said anion is a silicate anion.

7. A method according to claim 1 wherein said polymer is a condensation polymer of diethylenetriamine and adipic acid and epichlorohydrin.

8. A method according to claim 1 wherein said polymer is a condensation polymer of dimethylamine and epichlorohydrin and said anion is a silicate anion.

* * * * *

UNITED STATES PATENT AND TRADEMARK OFFICE
CERTIFICATE OF CORRECTION

PATENT NO. : 4,853,132

DATED : August 1, 1989

INVENTOR(S) : Merrell et al

It is certified that error appears in the above-identified patent and that said Letters Patent is hereby corrected as shown below:

Column 9, line 58, after "was", insert --- determined to be well detackified. The percent solids of the sludge ---.

Column 11, line 12, replace "diamene" with --- diamine ---.

Signed and Sealed this

Twenty-first Day of August, 1990

Attest:

HARRY F. MANBECK, JR.

*Attesting Officer*     *Commissioner of Patents and Trademarks*